(12) United States Patent
Anziano

(10) Patent No.: US 11,625,970 B2
(45) Date of Patent: Apr. 11, 2023

(54) INTERACTIVE FROZEN CONFECTIONERY VENDING MACHINE

(71) Applicant: Maximilian M. Anziano, Corte Madera, CA (US)

(72) Inventor: Maximilian M. Anziano, Corte Madera, CA (US)

(*) Notice: Subject to any disclaimer, the term of this patent is extended or adjusted under 35 U.S.C. 154(b) by 400 days.

(21) Appl. No.: 16/912,710

(22) Filed: Jun. 26, 2020

(65) Prior Publication Data
US 2020/0327769 A1    Oct. 15, 2020

Related U.S. Application Data

(63) Continuation-in-part of application No. 15/732,535, filed on Nov. 27, 2017, now Pat. No. 10,743,562.

(51) Int. Cl.
| | |
|---|---|
| G07F 17/00 | (2006.01) |
| A23G 9/28 | (2006.01) |
| A23G 9/22 | (2006.01) |

(52) U.S. Cl.
CPC ......... *G07F 17/0071* (2013.01); *A23G 9/228* (2013.01); *A23G 9/283* (2013.01); *A23G 9/288* (2013.01)

(58) Field of Classification Search
CPC ........ A23G 9/228; A23G 9/283; A23G 9/288; G07F 9/105; G07F 11/24; G07F 13/06; G07F 13/10; G07F 17/0071
See application file for complete search history.

(56) References Cited

U.S. PATENT DOCUMENTS

| | | | | |
|---|---|---|---|---|
| 5,011,042 A | * | 4/1991 | Bunce ................. | G07F 17/0078 219/700 |
| 5,727,609 A | * | 3/1998 | Knight .................... | G07F 13/10 141/129 |
| 6,725,889 B2 | * | 4/2004 | Perez Vales .......... | G07F 13/025 141/286 |
| 8,459,176 B2 | * | 6/2013 | Nevarez ............... | B67D 1/0051 99/290 |
| 8,989,893 B2 | * | 3/2015 | Jones ....................... | A23G 9/22 221/24 |
| 9,635,874 B2 | * | 5/2017 | Bruckner ................ | G07F 13/06 |

(Continued)

*Primary Examiner* — Gene O Crawford
*Assistant Examiner* — Kelvin L Randall, Jr.
(74) *Attorney, Agent, or Firm* — Ivan E. Rozek; Savantek Patent Services

(57) ABSTRACT

An interactive frozen confectionery vending machine with a freezer enclosure, a delivery and toppings dispensing enclosure and a control system enclosure. A programmable control system allows a customer to select a frozen confectionery cup stored within the freezer enclosure and to select a hard and soft topping that are automatically dispensed into the cup and the cup is delivered to the waiting customer through a customer access door that closes after the transaction is completed. A centrally located gear motor rotates an arm that terminates in a cup. The cup receives a topping from a canister and then rotates to drop the topping into the frozen confectionery cup. A soft topping is pumped via flexible liquid topping delivery tubes into a dispensing arm located above the frozen confectionery cup. A standard payment system and touch screen allow the customer to pay for and select frozen confectionery and toppings.

11 Claims, 14 Drawing Sheets

(56) References Cited

U.S. PATENT DOCUMENTS

| | | | |
|---|---|---|---|
| 2006/0162347 A1* | 7/2006 | Kateman | G07F 17/0071 |
| | | | 62/71 |
| 2006/0293956 A1 | 12/2006 | Walker et al. | |
| 2014/0120235 A1* | 5/2014 | Jones | G07F 17/0064 |
| | | | 901/30 |
| 2015/0144653 A1 | 5/2015 | Kline et al. | |
| 2015/0166322 A1* | 6/2015 | O'Sullivan | A23G 9/22 |
| | | | 221/96 |
| 2016/0242434 A1* | 8/2016 | Jones | A23G 9/225 |
| 2017/0014785 A1* | 1/2017 | Childers | B01F 33/85 |
| 2018/0368439 A1* | 12/2018 | Jones | A23G 9/228 |
| 2019/0159476 A1* | 5/2019 | Anziano | A23G 9/22 |
| 2019/0166872 A1* | 6/2019 | Mathijssen | A23G 9/22 |
| 2019/0272699 A1* | 9/2019 | Mohammed | G07F 13/10 |
| 2019/0318566 A1* | 10/2019 | Karimi-Shirazia | A23L 5/10 |
| 2020/0134961 A1* | 4/2020 | Edwards | B65B 7/16 |

* cited by examiner

INTERACTIVE FROZEN CONFECTIONERY VENDING MACHINE

CROSS REFERENCE TO RELATED APPLICATIONS

This is a continuation-in-part of application Ser. No. 15/732,535, filed on Nov. 27, 2017.

STATEMENT REGARDING FEDERALLY SPONSORED RESEARCH OR DEVELOPMENT

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of vending machines and more specifically to vending machines implementing means for a customer to select a product from a variety of frozen confectionery cups and to customize the selected cup from a selection of a variety of hard and liquid toppings.

Automated machines for dispensing frozen confectionery and other frozen confectioneries are known in the art. For example, Chirnomas (U.S. Pat. No. 5,027,698) discloses a frozen ice-cream vending machine wherein the machine dispenses pre-filled containers of ice-cream. Davis et al (United States Pat application 2004/0251270) describes an ice-cream dispensing machine for dispensing soft-serve ice-cream. Kateman et al (U.S. Pat. No. 7,052,728) describes a machine for vending single servings of different flavors, wherein selected flavorants are mixed into a base liquid prior to freezing. Jones et al (U.S. Pat. No. 7,896,038) discloses a confectionery vending machine that employs robotics to provide a customized frozen confection.

However, even though the above described devices deliver frozen confections in a somewhat custom manner, there are deficiencies in the prior technology. For example, in the Jones et al patent, an expensive robotic arm moves an ice-cream receiving cup to one of a variety of topping holding stations to have soft serve frozen confectionery delivered into the cup and then topping applied to the soft serve ice-cream. There is no ability to dispense standard frozen confectionery which tends to be harder and not suitable for dispensing through a tube. Second, there is no provision for applying the toppings in an evenly distributed manner within the cup. Third, the robotic arm is required to travel to each topping dispensing location. A simpler and more economical solution would be to have radially disposed toppings delivered to a centrally located frozen confectionery cup. Fourth, the frozen confectionery is stored in the top portion of the vending machine, requiring the entire top portion of the machine to be kept at freezing temperatures thereby incurring extra expense to maintain low temperature in an uninsulated environment, plus the likely event of excess moisture creating ice partials that can attach to the transparent front surface which defeats the intended viewing experience of the customer.

BRIEF SUMMARY OF THE INVENTION

Primary aspect of the present invention is to enable a customer to interactively choose a frozen confectionery cup from multiple frozen confectionery flavors, the chosen frozen confectionery cup further to be customizable by the customer via a touch screen with selections from multiple hard topping choices and from multiple liquid topping choices.

Another object of the interactive frozen confectionery vending machine is to provide an interactive frozen confectionery vending machine that uses a single rotatable carousel structure to store a plurality of stacked frozen confectionery cups in a freezer enclosure and to lift one cup at a time to a delivery and toppings dispensing enclosure.

Another object of the interactive frozen confectionery vending machine is to provide an interactive frozen confectionery vending machine that uses a vertically oriented rotating arm to deliver liquid toppings to a frozen confectionery cup.

Another aspect of the present invention is to provide an interactive frozen confectionery vending machine that uses a centralized gear motor to power an arm and attached cup to receive toppings from radially placed topping canisters and deliver the toppings to a frozen confectionery cup.

Yet another object of the interactive frozen confectionery vending machine is to provide an interactive frozen confectionery vending machine that dispenses eating utensils for use by customers.

Still yet another object of the interactive frozen confectionery vending machine is to provide an interactive frozen confectionery vending machine that includes lockable hinged doors to allow authorized persons only access to allow machine maintenance and to enable authorized persons only to restock the frozen confectionery and toppings.

Another object of the interactive frozen confectionery vending machine is to provide an interactive frozen confectionery vending machine that includes a backlit photo display which cycles on and off to notify the customer which liquid topping is selected to be dispensed.

Another object of the interactive frozen confectionery vending machine is to provide an interactive frozen confectionery vending machine that includes a rotatable customer access door that allows access to one cup of frozen confectionery only and closes after the customer removes the purchased cup to prevent customers from reaching inside the machine.

Other objects and advantages of the present invention will become apparent from the following descriptions, taken in connection with the accompanying drawings, wherein, by way of illustration and example, an exemplary embodiment of the present invention is disclosed.

In accordance with the exemplary embodiment of the interactive frozen confectionery vending machine, there is disclosed an interactive frozen confectionery vending machine comprising: a freezer enclosure, a delivery and toppings dispensing enclosure, a support equipment enclosure.

The support equipment enclosure further comprises cooling system components comprising a compressor, a condenser, coolant tubing and other standard and usual cooling system hardware. The support equipment enclosure further comprises a plurality of liquid topping canisters, an eating utensils storage and dispenser, customer selection hardware and a programmable control system.

The customer selection hardware, disposed on the front panel of the support equipment enclosure, comprises a toppings selection video display panel, customer payment processing module, the eating utensils dispenser and a customer interface touch screen.

The control system comprises a programmable digital control processing unit comprised of one or more microprocessors and other electronic and electrical components configured and programmed to process customer selections, converting the customer selections into control actions sequencing the activities of the interactive frozen confectionery vending machine. The programmable digital control processing unit further comprises customer selected payment method processing, including wired and wireless communication with payment centers.

The liquid topping canisters store liquid toppings, wherein the term liquid topping comprises any viscous liquid that can be moved by a pump, wherein the liquid topping is pumped via a viscous liquid pump, such as a diaphragm pump, a gear pump or a piston pump, to exit ports located at the distal end of a liquid topping dispensing arm via a plurality of flexible tubes.

The freezer enclosure comprises a plurality of frozen confectionery cups stored in a plurality of stacks on a rotating platform, wherein a mechanism controlled by the programmable digital control processing unit causes a customer selected frozen confectionery cup to be delivered to a frozen confectionery slidable cup retaining platform in the delivery and toppings dispensing enclosure, wherein the customer can remove the frozen confectionery cup, remove the lid of the frozen confectionery cup, then return the cup to the top surface of the frozen confectionery slidable cup retaining platform, wherein the rotatable customer access door closes, thereby initiating a sequence of dispensing the customer selected toppings.

The dispensing sequence depends on customer chosen topping, selected liquid toppings preferably dispensed first by a liquid topping delivery arm, followed by a rotatable arm's toppings dispensing motor causing a hard topping to be dispensed into the rotatable cup, the arm rotating so that the rotating cup is above the frozen confectionery cup, the rotating cup rotating one hundred and eighty degrees to drop the selected hard topping into the frozen confectionery cup, whereupon the customer removes the frozen confectionery from the frozen confectionery slidable cup retaining platform, causing the front rotatable customer access door to close.

BRIEF DESCRIPTION OF THE DRAWINGS

The drawings constitute a part of this specification and include an exemplary embodiment of the interactive frozen confectionery vending machine, which may be embodied in various forms. It is to be understood that in some instances various aspects of the interactive frozen confectionery vending machine may be shown exaggerated or enlarged to facilitate an understanding of the interactive frozen confectionery vending machine.

DETAILED DESCRIPTION

Detailed descriptions of the exemplary embodiment of the principles of the invention are provided herein. It is to be understood, however, that the present invention may be embodied in various forms. Therefore, specific details disclosed herein are not to be interpreted as limiting, but rather as a basis for the claims and as a representative basis for teaching one skilled in the art. It is also to be understood that the presented terminology is for the purpose of description and should not be regarded as limiting.

Figure 1:
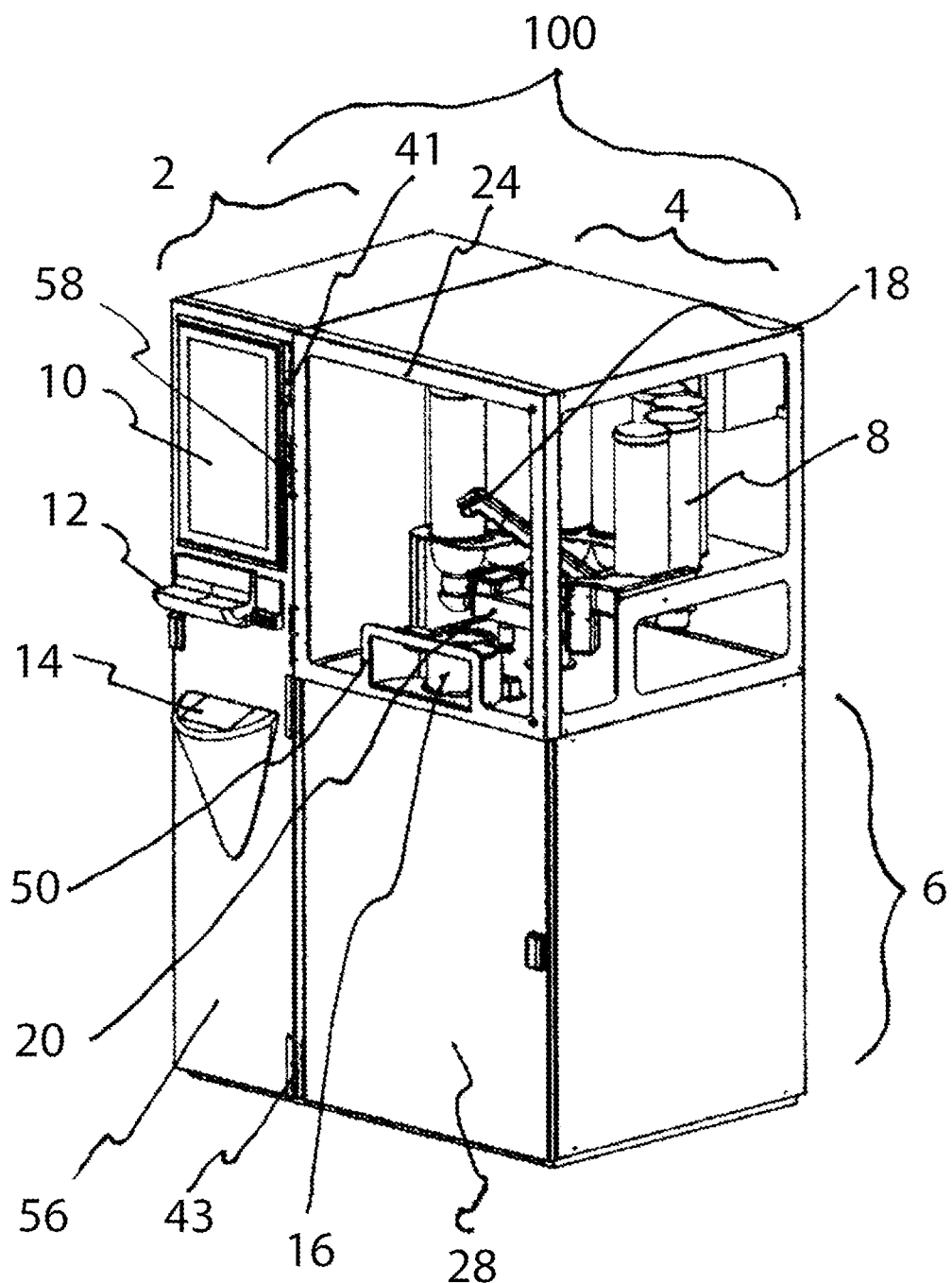
FIG. 1 is a perspective view of the interactive frozen confectionery vending machine.

Referring now to FIG. 1, we see a perspective view of the interactive frozen confectionery vending machine 100. The interactive frozen confectionery vending machine 100 is made up of at least three major enclosures: the freezer enclosure 6, the delivery and toppings dispensing enclosure 4 and the support equipment enclosure 2. The front of each enclosure 2, 4, 6 includes a hinged door that is lockable via a standard lock assembly. The walls separating the enclosures 2, 4, 6 from each other comprise fittings and functional openings to facilitate interworking of equipment disposed in said enclosures. The front surface of the support equipment enclosure 2 includes a video display panel 10. The video display panel 10 can show animated images while the interactive frozen confectionery vending machine is in its initial waiting state, the images displaying preprogrammed messages to a potential customer. An eating utensils dispenser 12 and a touch screen 14 are located just below the video display panel 10. The delivery and toppings dispensing enclosure 4 includes transparent panels on the front and side of the enclosure to allow a customer to view the toppings as the dispensing activity happens. A plurality of radially disposed hard topping canisters 8 can be accessed by a centrally rotating hard toppings dispenser arm 50. Liquid toppings are stored in the top rear portion of enclosure 2. The term liquid toppings or soft toppings are used interchangeably in the writing of the present specification; the liquid or soft toppings comprise all viscous fluid toppings.

Front panel 28 of the freezer enclosure can open via hinges 43 to allow a service person to refill frozen confectionery cups that are stored within the freezer enclosure 6.

Front door 24 of the delivery and toppings dispensing enclosure can open via hinges 41. Front panel 56 of support equipment enclosure can be opened via hinges 58. Rotatable customer access door 16 of the delivery and toppings dispensing enclosure 4 is opened and closed by the programmable digital control system to allow a customer access to a purchased frozen confectionery cup as shown in the section view in FIG. 5. Touch screen 14 allows the customer to choose from multiple frozen confectionery flavors, the chosen frozen confectionery cup further customizable by the customer via the touch screen with selections from multiple hard topping choices and from multiple liquid topping choices. It will be apparent to those skilled in the art that the touch screen is a bidirectional customer machine information input and output interface, processing haptic inputs and visually displaying prompts and information. A programmable digital processing unit, not shown, receives inputs from the touch screen and controls all functions, including but not limited to frozen confectionery cup lifting, hard and liquid toppings dispensing, rotatable customer access door opening and closing, and payment operations.

Figure 2:
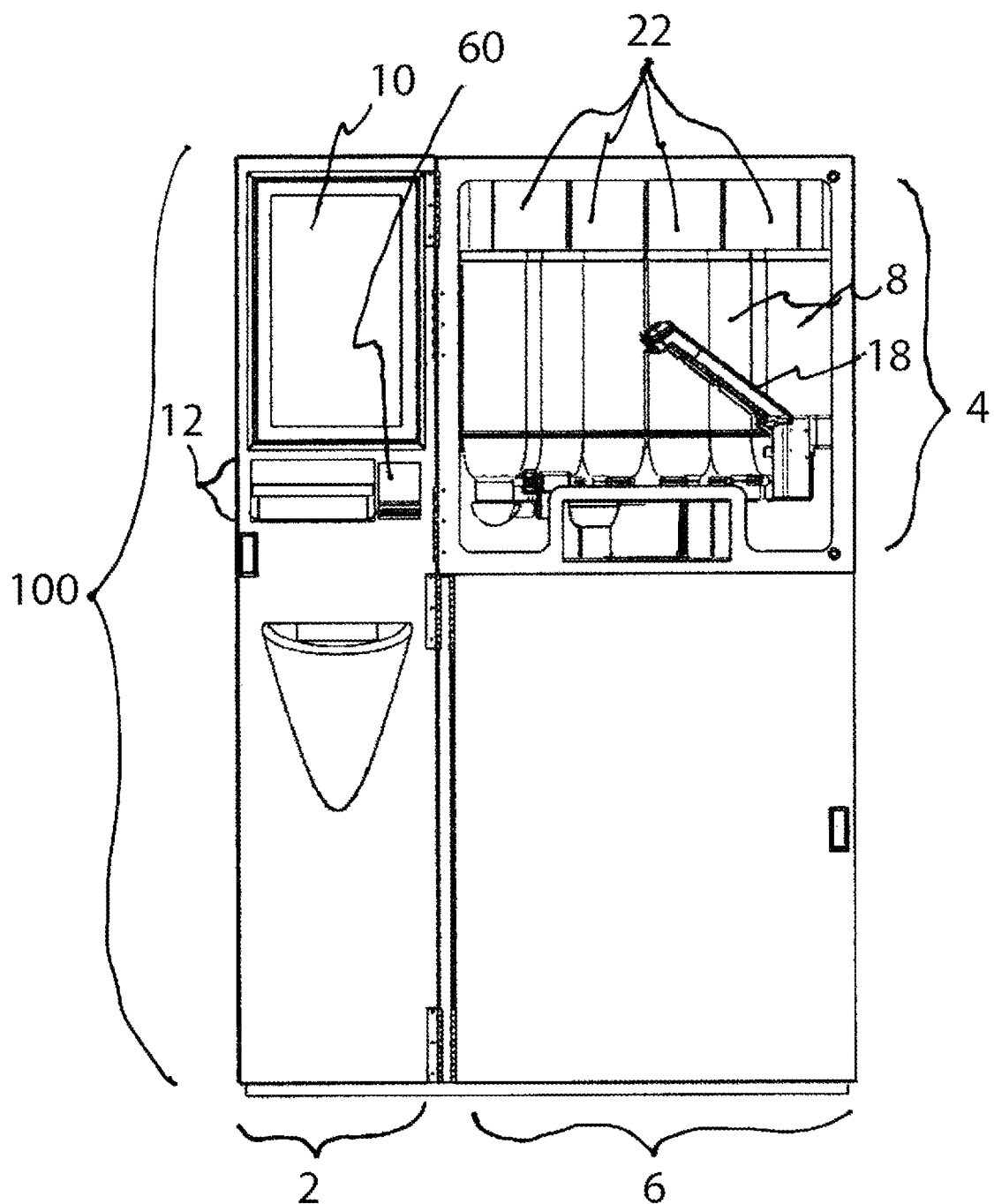
FIG. 2 is a front view of the interactive frozen confectionery vending machine.

FIG. 2 is a front view of the interactive frozen confectionery vending machine 100. Photo panels 22 are backlit and show the flavors of a plurality of different liquid toppings. When a liquid topping is being dispensed by liquid topping dispensing arm 18, the corresponding photo panel will light up intermittently to show the customer which liquid topping is being delivered to the waiting frozen confectionery cup 26 as shown in the section view in FIG. 5. Payment processing module 60 is accessible to the customer for paying for frozen confectionery and toppings.

Figure 3:
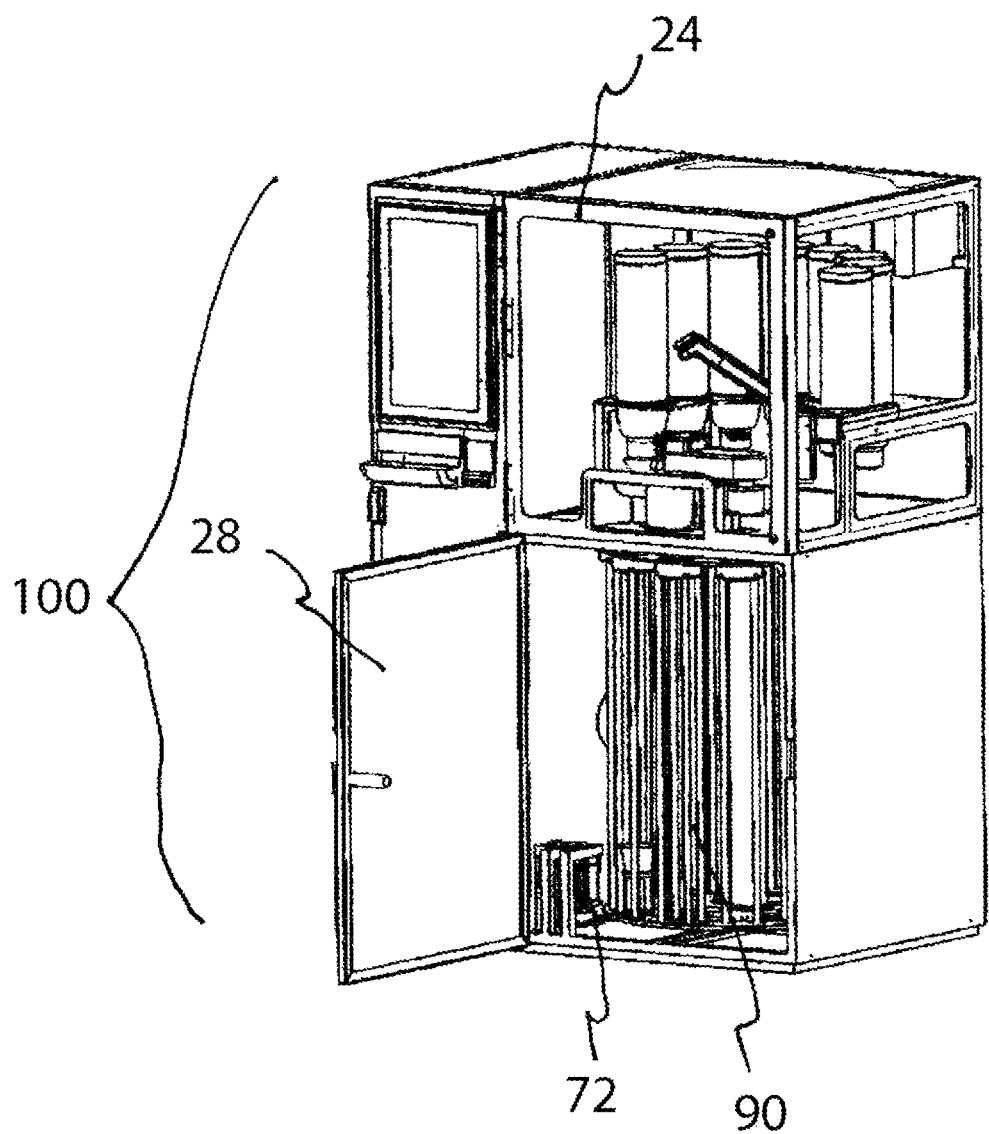
FIG. 3 is a perspective view of the interactive frozen confectionery vending machine with freezer enclosure door opened.

FIG. 3 is a perspective view of the interactive frozen confectionery vending machine with the freezer enclosure door in the open position revealing the carousel assembly 90 and the radially distributed stacks of frozen confectionery on the carousel periphery, wherein the carousel can be caused to rotate by stepper motor 72. The carousel assembly 90 comprises vertical rods that retain stacked frozen confectionery cups. When a customer selects a frozen confectionery flavor, the carousel assembly rotates to the proper column of frozen confectionery cups and lifts the column to the point where one frozen confectionery cup 26 rises into the delivery and toppings dispensing as shown in the section view in FIG. 5.

Figure 4:
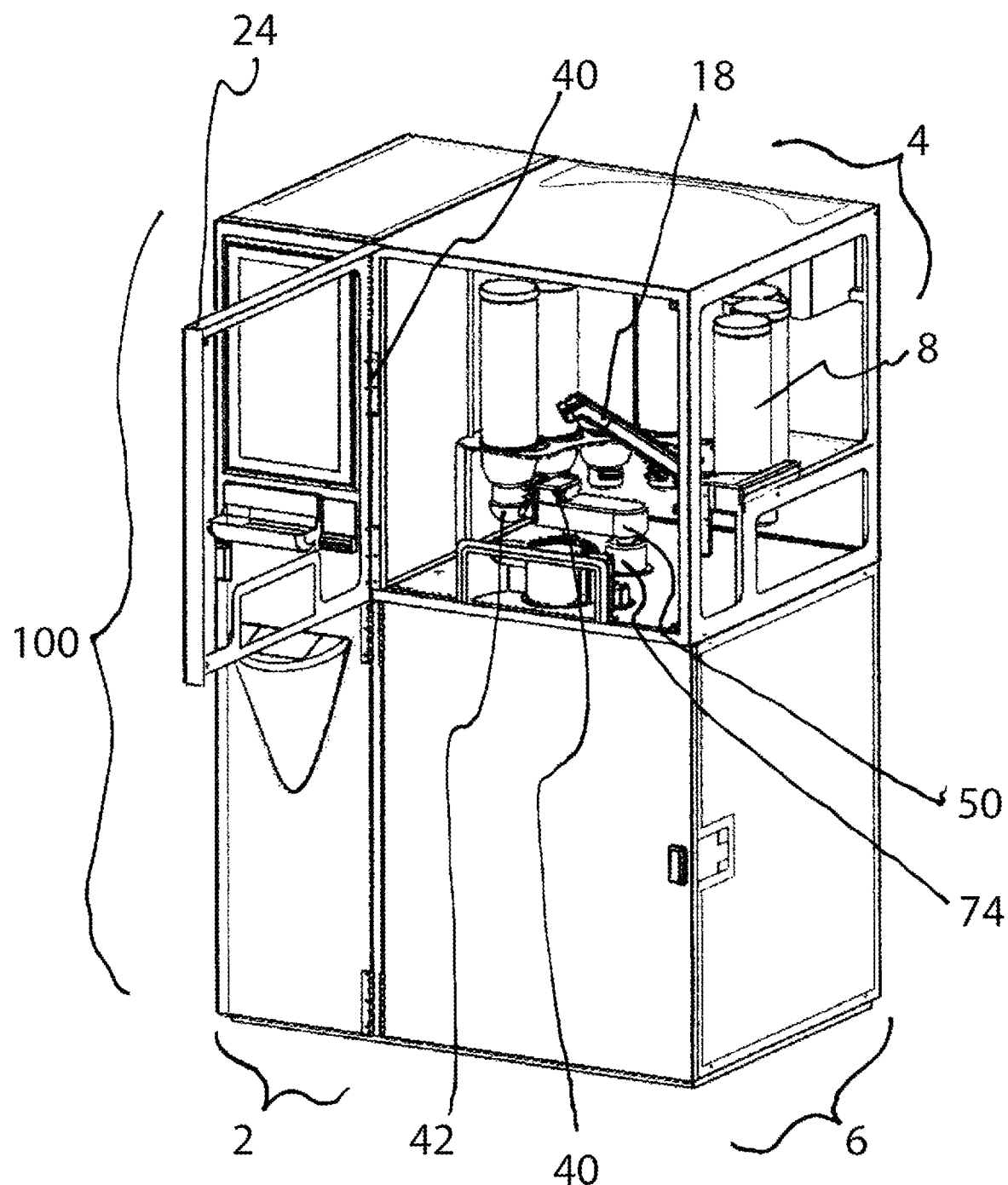
FIG. 4 is a perspective view of the interactive frozen confectionery vending machine with delivery and toppings dispensing enclosure door opened.
Figure 5:
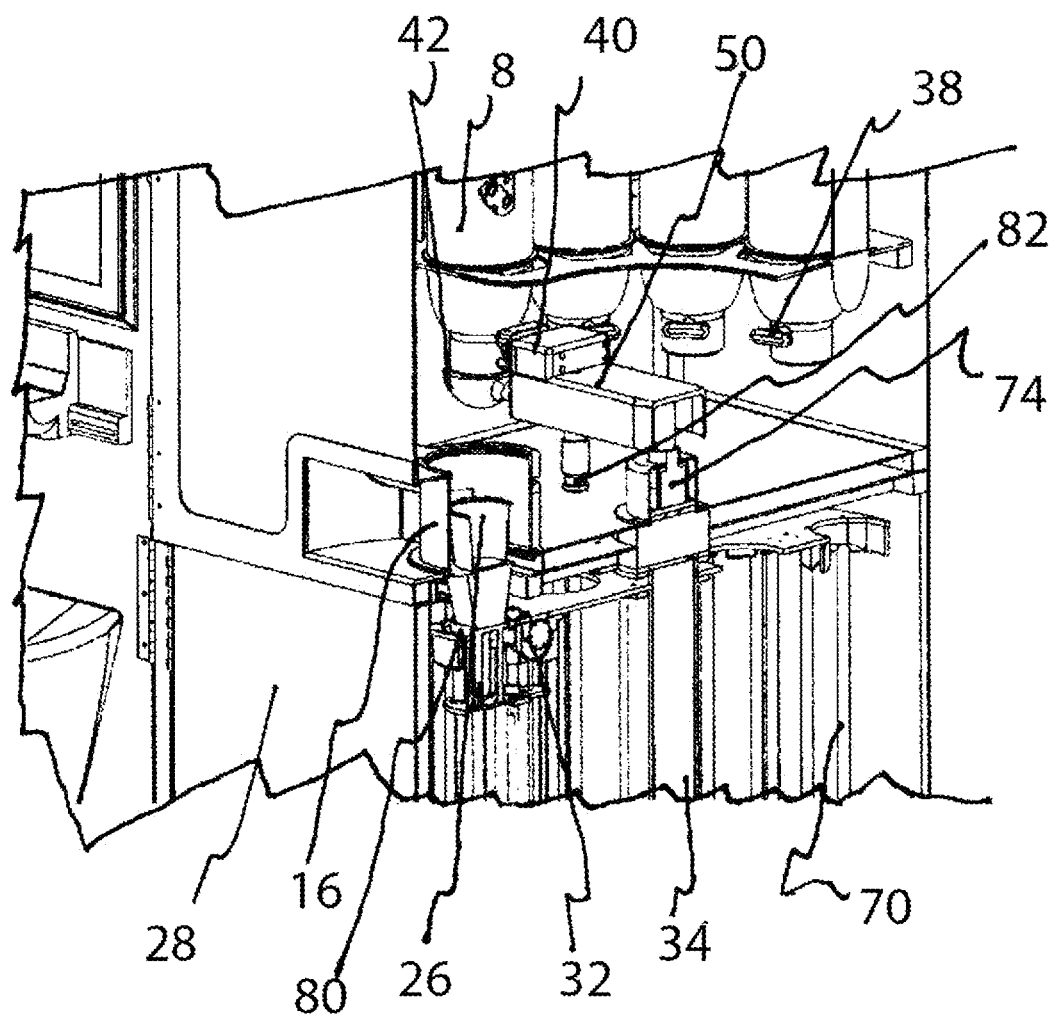
FIG. 5 is a partial section view bisecting the freezer enclosure and the delivery and toppings dispensing enclosure, showing a frozen confectionery cup in position to receive toppings.

FIG. 4 is a perspective view of the interactive frozen confectionery vending machine 100 with the delivery and toppings dispensing enclosure door 24 in the open position. Stepper motor 74 rotates hard toppings dispenser arm 50 to the selected topping canister 8. A servo motor 40 located on the distal end of the hard toppings dispenser arm 50 rotates a knob 38 as shown in FIG. 5 that causes a rotatable gate, not shown, to open the hard topping cannister for delivering a portion of topping to be dropped into a cup 42. The hard toppings dispenser arm 50 can then be rotated until the cup 42 is directly over the frozen confectionery cup 26. Roller bearing 52 supports the dispenser arm 50 on the floor of the delivery and toppings dispensing enclosure 4 to ensure that the arm retains its proper horizontal orientation. A servo motor at the distal end of hard toppings dispenser arm 50 can rotate the cup 42 one hundred and eighty degrees so that the topping contained in the cup 42 falls onto the top of the frozen confectionery in cup 26. Liquid topping dispensing arm 18 can rotate vertically down to just above the frozen confectionery cup 26 where the selected liquid topping can be dispensed via pumps from liquid toppings containers located within the support equipment enclosure. A flexible tube for each liquid topping extends from each pump to the tip of the liquid topping dispensing arm 18. Non-drip spring biased exit ports at the end of each tube prevent excess liquid from escaping during non-use periods. The lockable door 24 can be opened via hinges 41 to allow a service person to restock the hard topping canisters 8.

FIG. 5 is a partial section view bisecting the freezer enclosure 6 and the delivery and toppings dispensing enclosure 4. A gear motor 32 coupled with a cable lifts a cup liftable platform 80 up until a frozen confectionery cup 26 enters the delivery and topping dispensing area. Each stack of frozen confectionery cups has its own cup liftable platform 80 that lifts each stack of frozen confectionery cups 26. Rotatable customer access door 16 is shown in the closed position, so that the customer cannot have access into the dispensing area when not granted access. Central tubular column 34 acts as a central rotation point for carousel assembly 90. Vertical rods are arranged in groups of at least four, three solid rods 70 and one spring biased rod 71, to trap stacks of frozen confectionery cups 26. One or more of the rods of the group are spring biased to allow it to be removed to reload a stack of frozen confectionery cups 26.

Figure 6:
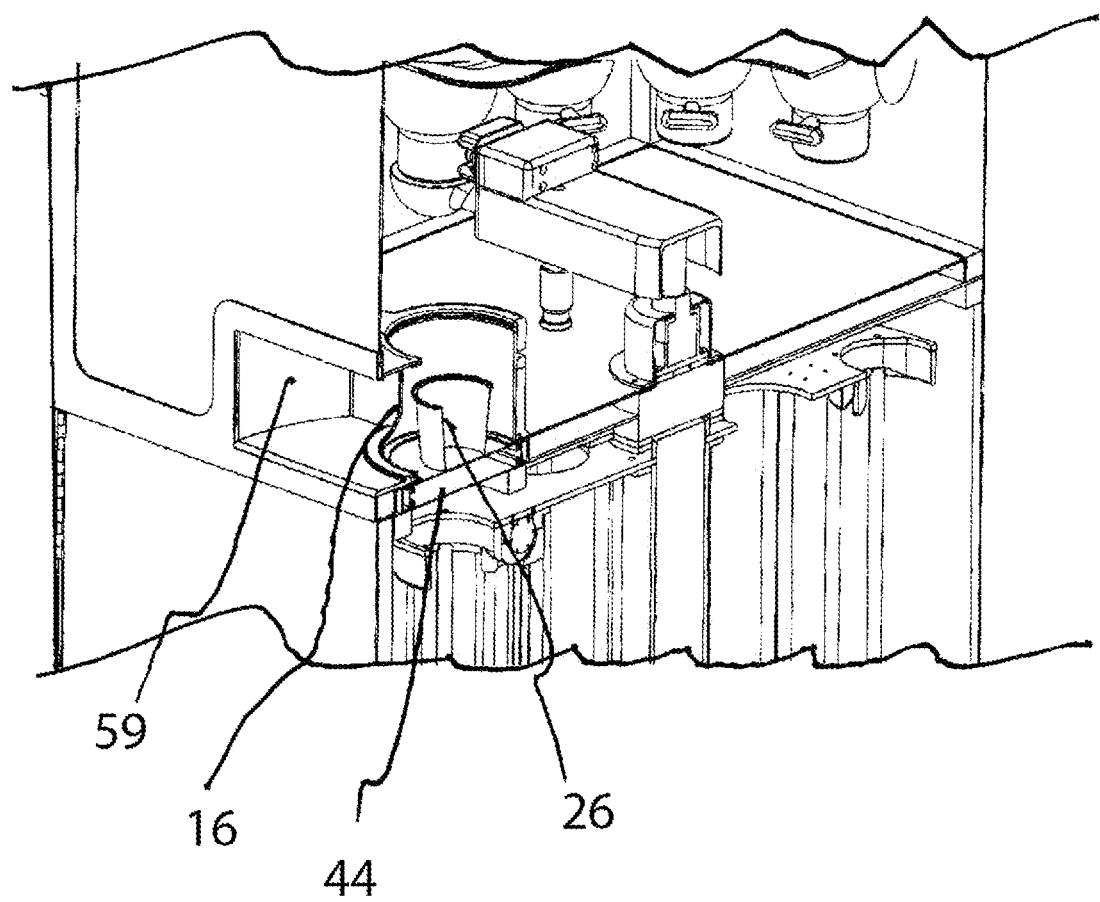
FIG. 6 is a section view showing the rotatable customer access door in the open position.

FIG. 6 is a partial section view of the interactive frozen confectionery vending machine. A freezer enclosure 6 ceiling aperture and a delivery and topping dispensing enclosure 4 floor aperture are shown. A freezer enclosure 6 ceiling aperture and a delivery and topping dispensing enclosure 4 floor aperture are identically sized and are vertically aligned. Furthermore, a slidable cup retaining platform 44 is shown in FIG. 6, said slidable cup retaining platform being able to close the opening between the freezer enclosure 6 ceiling aperture and the delivery and topping dispensing enclosure 4 floor aperture.

Furthermore, FIG. 6 is showing the rotatable customer access door 16 in the open position allowing a customer access to the frozen confectionery cup 26 while the cup 26 is resting on slidable cup retaining platform 44. The slidable cup retaining platform 44 closes the aperture between the freezer enclosure 6 ceiling and the delivery and toppings dispensing enclosure 4 thereby eliminating the possibility of a customer from reaching down into the freezer enclosure 6 to grab an additional frozen confectionery cup 26. The slidable cup retaining platform also keeps the aperture closed in between uses thereby restricting the exit of freezing air from the freezer enclosure 6.

Figure 7:
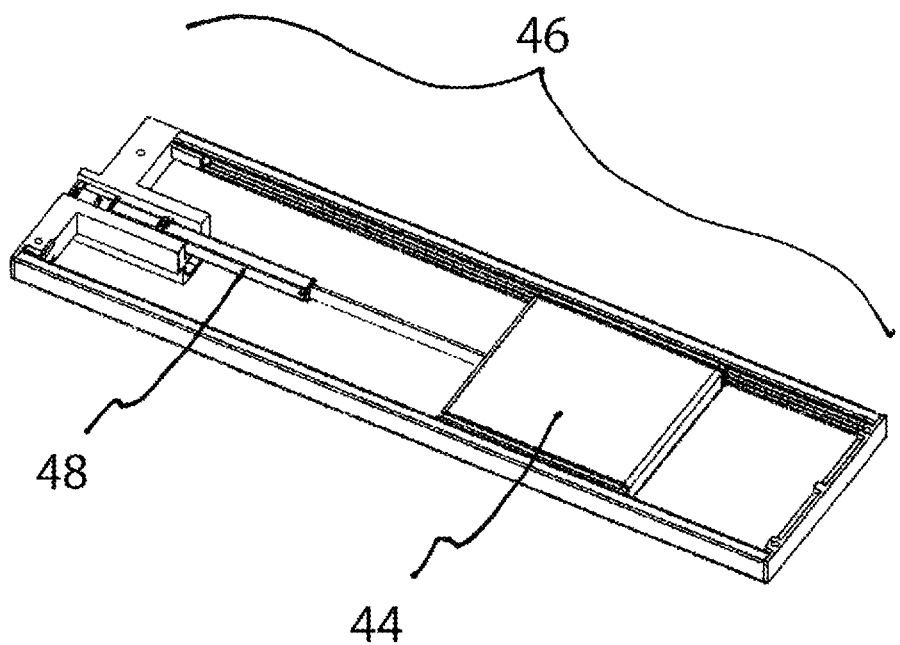
FIG. 7 is a perspective view of the slidable cup retaining platform in the closed position.

FIG. 7 is a perspective view of the slidable cup retaining platform assembly 46 with the slidable cup retaining platform 44 in the closed position.

Figure 8:
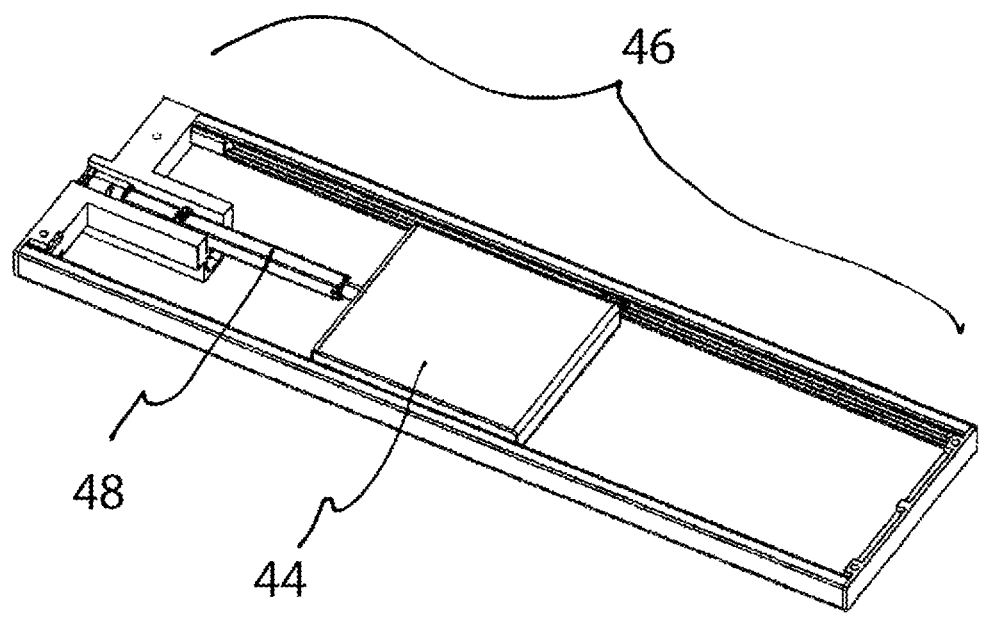
FIG. 8 is a perspective view of the slidable cup retaining platform in the open position.

FIG. 8 is a perspective view of the slidable cup retaining platform assembly 46 with the slidable cup retaining platform 44 in the open position via linear actuator 48.

Figure 9:
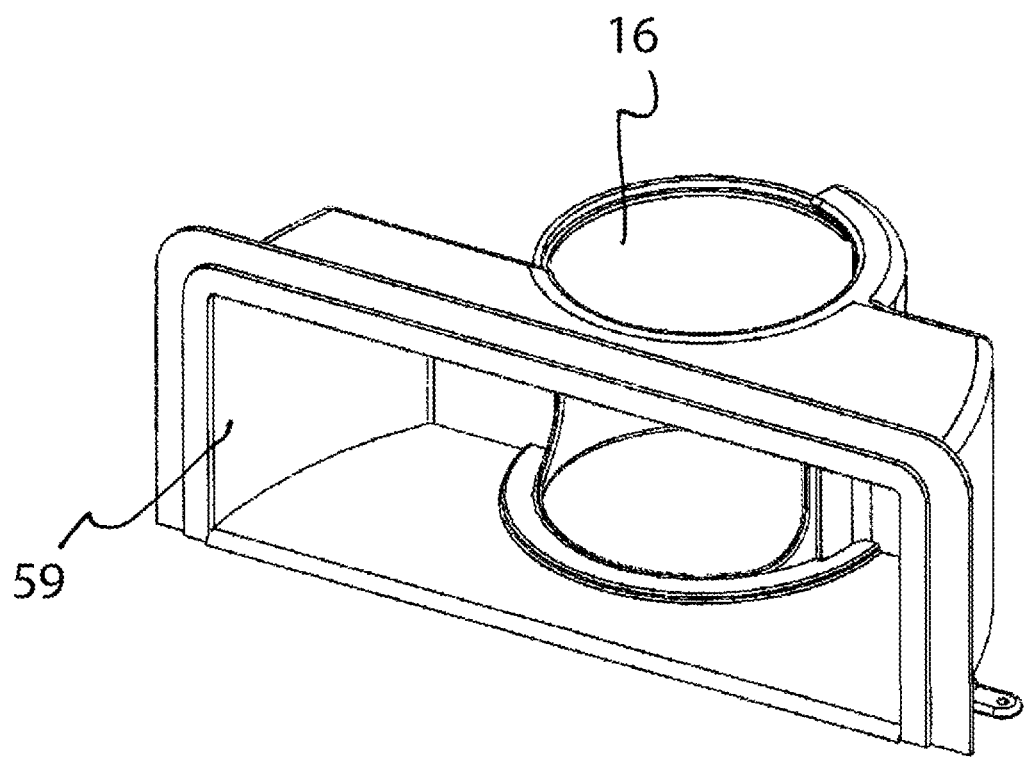
FIG. 9 is a perspective view of the rotatable customer access door assembly in the open position.

FIG. 9 is a perspective view of the rotatable customer access door surround 59 with the rotatable customer access door 16 in the open position. The rotatable customer access door 16 includes a circular base that has gear teeth, not shown, around its perimeter. A gear motor, not shown, has a matching drive gear that engages the teeth of the rotatable customer access door 16 to cause it to revolve to an open position or a closed position.

Figure 10:
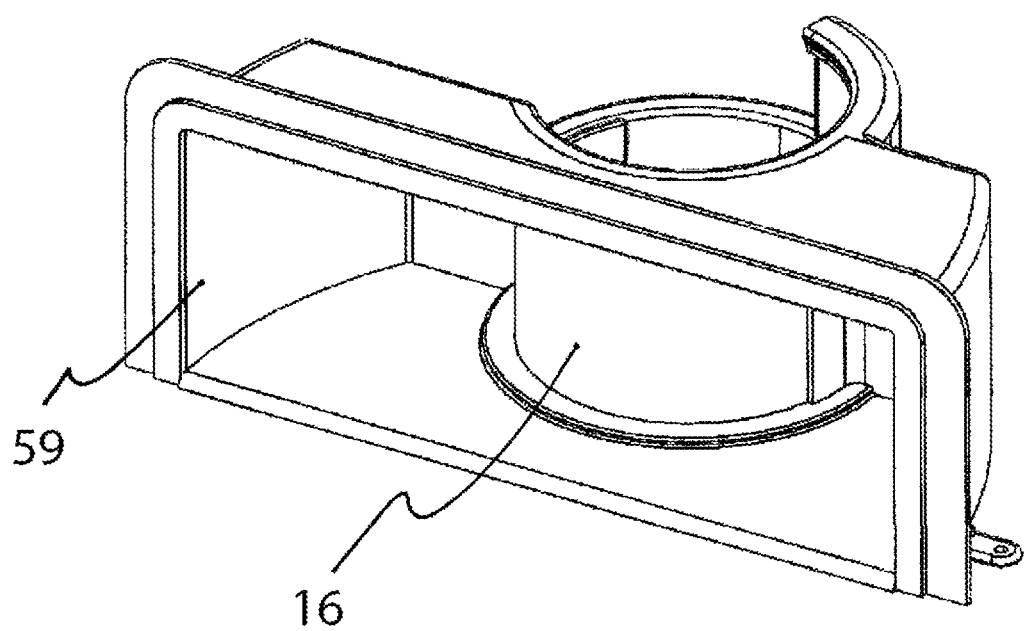
FIG. 10 is a perspective view of the rotatable customer access door assembly in the closed position.

FIG. 10 is a perspective view of the rotatable customer access door surround 59 with the rotatable customer access door 16 in the closed position.

Figure 11:
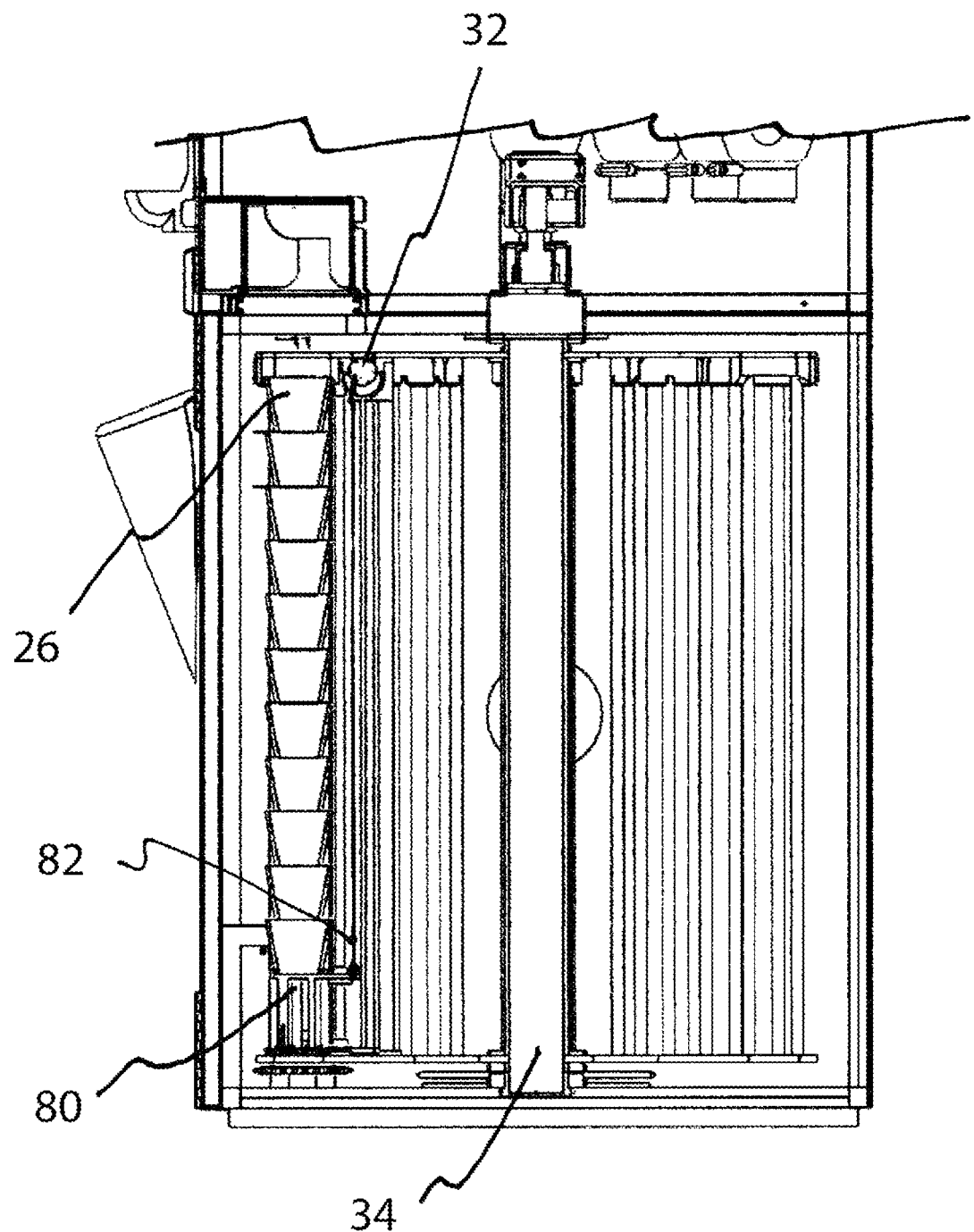
FIG. 11 is a side section view of the freezer enclosure showing a stack of frozen confectionery cups before they are lifted.

FIG. 11 is a side section view of the freezer enclosure 6 that shows a stack of frozen confectionery cups 26 ready to be lifted by cup liftable platform 80. The platform 80 is lifted by cable 82 that can be rolled up or let down by gear motor 32.

Figure 12:
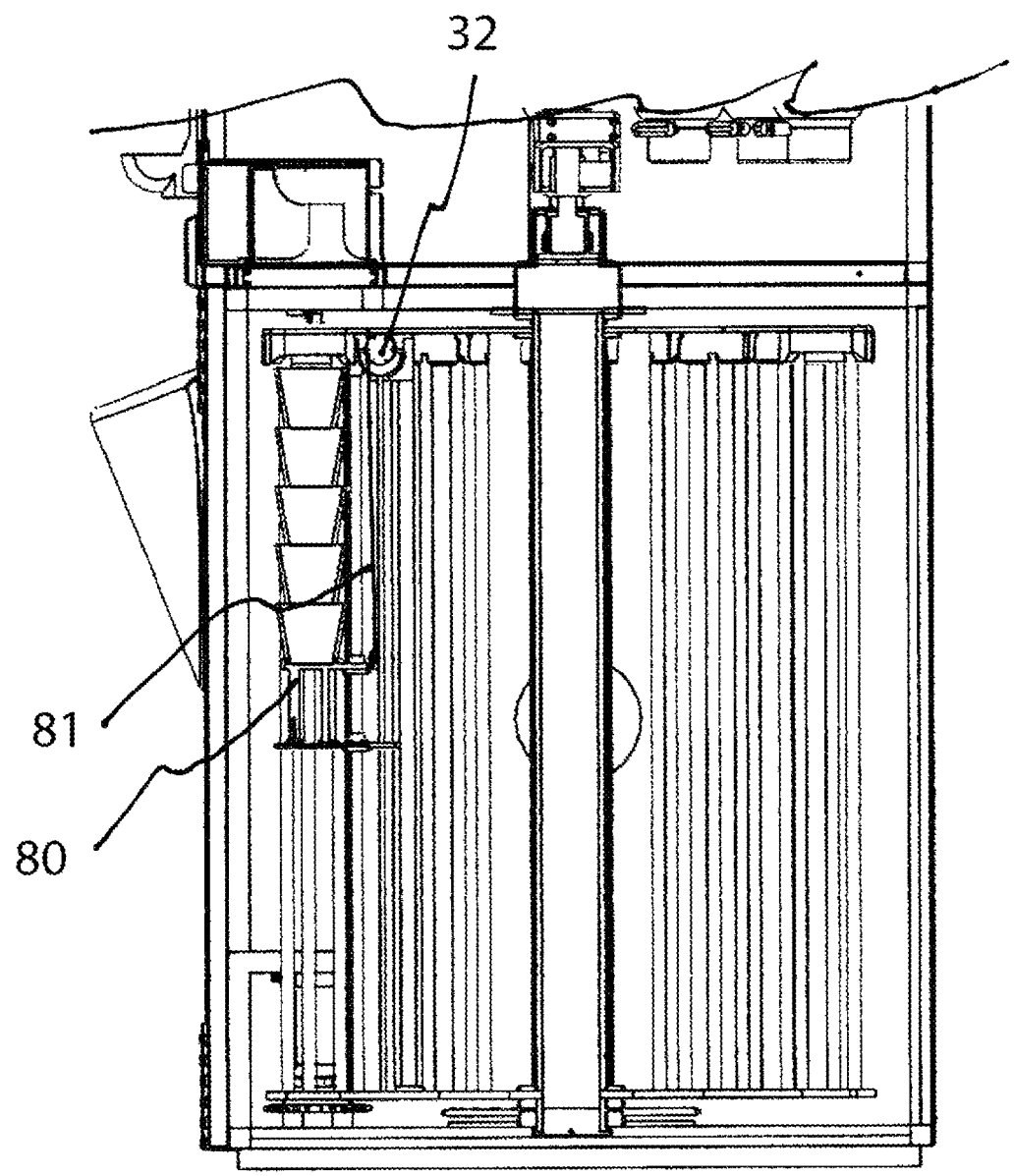
FIG. 12 is a side section view of the freezer enclosure showing a stack of frozen confectionery cups being lifted halfway up.

FIG. 12 is a side section view of the freezer enclosure 6 showing the stack of frozen confectionery cups 26 lifted halfway up as frozen confectionery is delivered to the delivery and toppings dispensing area 4.

Figure 13:
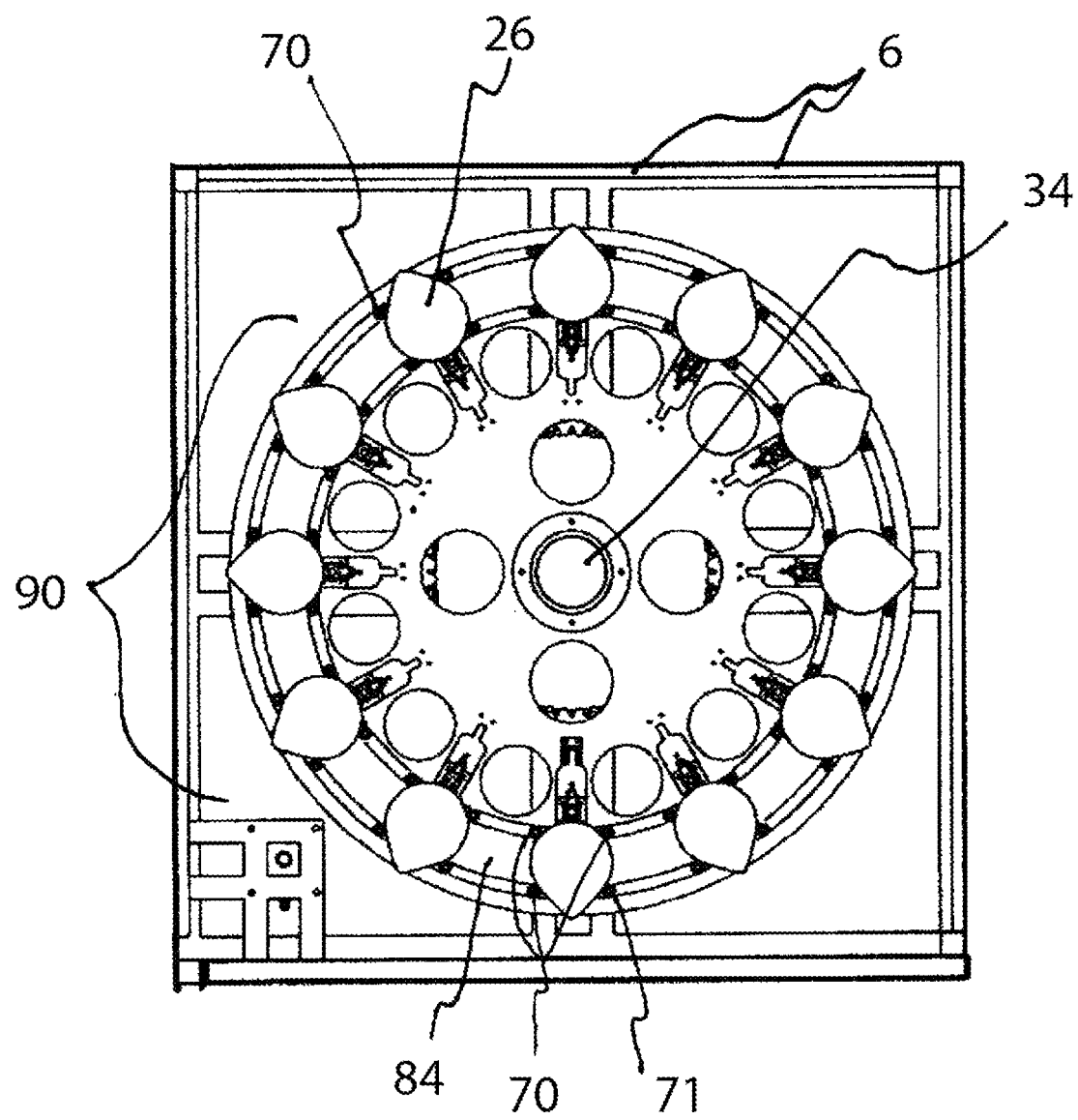
FIG. 13 is a plan view looking down on the stacks of frozen confectionery cups with the carousel.

FIG. 13 is a plan view looking down on the stacks of frozen confectionery cups 26 shown in a radial pattern on carousel base platform 84. In the exemplary embodiment shown, there are a total of twelve stacks of frozen confectionery cups 26.

Figure 14:
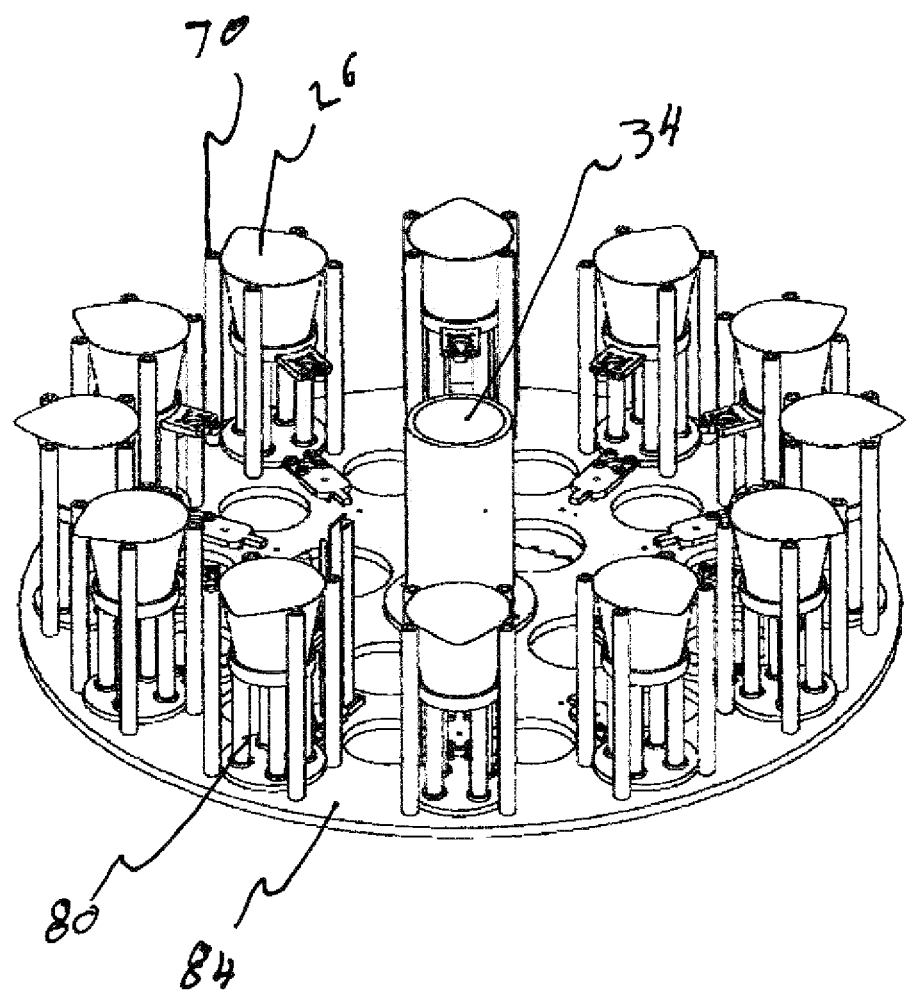
FIG. 14 is a partial perspective view showing the bottom portion of the carousel assembly.

FIG. 14 is a sectioned perspective view of the bottom portion of the carousel assembly. In the exemplary embodiment shown this view clearly depicts each column of frozen confectionery cups 26 being retained by four rods. Three solid rods 70 and one spring biased rod 71 are arranged in clusters of four; the spring biased rod 71 allows the spring biased rod 71 to be removed when refilling the carousel with frozen confectionery. The number of rods and number of spring rods are specific to the illustrated exemplary embodiment only.

The customer use experience is as follows: The customer presses a central graphic button on the touch screen 14. The customer is prompted by a visual prompt, a voice prompt or a combination of the visual and voice prompts, to choose from a plurality of frozen confectionery flavors. The customer is then prompted to choose none or one or more hard toppings by pressing on graphic buttons that are associated with each topping. Then the customer is prompted to choose from a plurality of liquid toppings by touching graphic buttons that are associated with each liquid topping. Then the customer is asked to pay for the frozen confectionery and toppings via the payment processing module 60 located at the front of enclosure 2. After successful completion of the payment process, the slidable cup retaining platform 44 opens and the selected frozen confectionery cup rises from the freezer enclosure 6. The rotatable customer access door then opens allowing the customer to remove the cup of frozen confectionery and remove the lid of the frozen confectionery cup and then replace the cup inside the delivery and toppings dispensing, a cup presence sensor will determine whether the frozen confectionery cup has been removed and replaced. The rotatable customer access door closes after the frozen confectionery cup has been replaced. Then the selected liquid toppings are dispensed, and then the selected hard toppings are dispensed. Finally, the rotatable customer access door opens again and allows the customer to remove the finished frozen confectionery treat. Upon removal, the slidable cup retaining platform closes and the rotatable customer access door also revolves to the closed position to wait for the next customer. It will be apparent to those skilled in the art that the cup presence sensor can be implemented by one or more of available means, such as a weight sensor, a photo sensor, or another proximity sensor.

The process of selecting frozen confectionery and toppings may also be facilitated wirelessly, such as by a phone app. Additionally, the amount of frozen confectionery and toppings stored within the interactive frozen confectionery vending machine at any time may be sensed by standard sensing devices located throughout the machine and wirelessly transmitted to a service person at a remote location.

If there is a malfunction of any of the electro mechanical features or of the compressor and condenser used to keep the freezer enclosure cold, the entire interactive frozen confectionery vending machine 100 will become inactive, and any attempt by a customer to operate the interactive frozen confectionery vending machine 100 will be unsuccessful until entire interactive frozen confectionery vending machine 100 is brought back to proper working order. The functional status of the interactive frozen confectionery vending machine may be wirelessly transmitted to a service person at a remote location.

In another embodiment, not shown, the shape of the frozen confectionery cup 26 may be rectangular or another geometrically irregular shape. Yet in another embodiment, not shown, the interactive frozen confectionery vending machine can be easily adapted to products other than the frozen confectionery presented in the exemplary embodiment of the invention, such as frozen savory meals and snacks.

While the interactive frozen confectionery vending machine has been described in connection with the exemplary embodiment, it is not intended to limit the scope of the interactive frozen confectionery vending machine to the particular form set forth, but on the contrary, it is intended to cover such alternatives, modifications, and equivalents as may be included within the spirit and scope of the interactive frozen confectionery vending machine as defined by the appended claims.

The invention claimed is:

1. An interactive frozen confectionery vending machine configured to interactively provide a customer with a selection from a plurality of flavors of frozen confectionery cups and with a selection from a plurality of toppings, said interactive frozen confectionery vending machine comprising at least three major enclosures:
   a support equipment enclosure;
   a freezer enclosure located next to the support equipment enclosure;
   a delivery and toppings dispensing enclosure located next to the support equipment enclosure above the freezer enclosure;
   walls enclosing interiors of the major enclosures, said walls comprising a plurality of openings among the major enclosures;
   the freezer enclosure comprising a rotatable carousel configured to support multiple stacks of frozen confectionery cups in said freezer enclosure;
   the frozen confectionery cups comprising a customer removable lid;
   the freezer enclosure further comprising a ceiling, wherein an aperture is disposed on said freezer enclosure ceiling;
   the delivery and toppings dispensing enclosure comprising a floor, an aperture disposed on said delivery and toppings dispensing enclosure floor, wherein the aperture disposed on the delivery and toppings dispensing enclosure floor is vertically aligned with the aperture on the freezer enclosure ceiling;
   a slidable cup retaining platform configured to support a frozen confectionery cup, said slidable cup retaining platform disposed between the freezer enclosure ceiling and the delivery and toppings dispensing enclosure wall floor; said slidable cup retaining platform capable of being in an open position and in a closed position; wherein the slidable cup retaining platform and the aperture disposed on the delivery and toppings dispensing enclosure wall floor and the aperture disposed on the freezer enclosure wall ceiling are aligned; wherein the delivery and toppings dispensing enclosure and the freezer enclosure are sealed from each other when the slidable cup retaining platform is in the closed position;
   a plurality of cup liftable platforms, each cup liftable platform configured to lift one stack of frozen confectionery cups;
   a cup liftable platform lifting mechanism;

a plurality of liquid topping canisters, a bottom of each liquid topping canister comprising a pump connected to a flexible liquid topping delivery tube;

each flexible liquid topping delivery tube configured to deliver a liquid topping to a vertically rotatable liquid topping dispensing arm;

a plurality of hard topping canisters, said hard topping canisters radially disposed in the delivery and toppings dispensing enclosure, a bottom of each hard topping canister comprising an opening, further comprising a rotatable gate able to rotate to a position wherein said opening is closed and be able to rotate to a position wherein the opening is open; said rotatable gate further comprising a rotatable knob;

a rotatable hard topping dispensing arm centrally disposed in the delivery and toppings dispensing enclosure;

a rotatable frozen confectionery cup customer access door, said customer access door being able to be in an open position, wherein when the customer access door is in the open position, the customer can reach the frozen confectionery delivery platform, wherein when the customer access door is in the closed position, the customer is prevented from reaching the confectionery delivery platform;

a payment system;

a control system comprising a programmable digital control processing unit;

a touch screen comprising information input means, the touch screen further comprising output means, wherein said input means and said output means provide means for communication between the customer, the programmable digital control processing unit and the payment system; and the programmable digital control processing unit configured to sequence dispensing of the customer selected frozen confectionery cup, dispensing of the customer selected liquid toppings and dispensing of the customer selected hard toppings.

2. The interactive frozen confectionery vending machine of claim 1 wherein:

the rotatable carousel comprises a periphery, wherein the multiple stacks of frozen confectionery cups are radially evenly distributed on said periphery of the rotatable carousel;

each stack of frozen confectionery cups surrounded by a group of at least four rods, wherein at least one rod of the group of at least four rods is removable to enable access to the stack of frozen confectionery cups surrounded by said rods;

the carousel being rotatable to align the selected flavor of frozen confectionery cups with said lifting platform;

the lifting platform aligned with the slidable cup retaining platform; and the programmable digital control processing unit configured to sequence movements of the rotatable carousel, the cup liftable platform, the cup liftable platform lifting mechanism, the slidable cup retaining platform, the rotatable frozen confectionery cup customer access door.

3. The interactive frozen confectionery vending machine of claim 1 wherein each flexible liquid topping tube is terminated with a non-drip spring biased exit port.

4. The interactive frozen confectionery vending machine of claim 1 wherein the rotatable liquid topping dispensing arm comprises means for rotating said rotatable liquid topping dispensing arm in a vertical plane, said liquid topping dispensing arm being lowered to dispense a selected liquid topping and the liquid topping dispensing arm being raised after said liquid topping dispensing is completed.

5. The interactive frozen confectionery vending machine of claim 1 wherein the rotatable hard toppings dispensing arm further comprises:

a motor end, wherein said motor end comprises motor means to drive the arm to the selected hard topping canister rotatable gate and to the frozen confectionery cup disposed on the slidable cup retaining platform;

a distal end, wherein said distal end comprises motor means to rotate the hard topping canister rotatable gate knob; and the distal end further comprising a rotatable cup and motor means to rotate said rotatable cup.

6. The interactive frozen confectionery vending machine of claim 1 wherein the slidable cup retaining platform further comprising a frozen confectionery cup presence sensor.

7. The interactive frozen confectionery vending machine of claim 1 further comprising a plurality of backlit photo panels, wherein each of the photo panel corresponds to one of the liquid topping canisters, wherein each photo panel lights up intermittently when the corresponding liquid canister is dispensing.

8. The interactive frozen confectionery vending machine of claim 1 further comprising a video display panel, wherein said video display panel is capable of displaying animated images.

9. The interactive frozen confectionery vending machine of claim 1 further comprising a utensil dispenser.

10. The interactive frozen confectionery vending machine of claim 1 wherein the toppings delivery enclosure further comprises a front door and a side wall panel, wherein said front door and said side wall panel are transparent.

11. The interactive frozen confectionery vending machine of claim 1, wherein the vending machine is in an initial waiting state expecting a customer initiated sequence of steps, wherein the sequence of steps is initiated by the customer interacting with the interactive frozen confectionery vending machine, wherein said sequence of steps comprises:

a. the customer initiates a frozen confectionery purchase by using the touch screen;

b. the customer is prompted to select the frozen confectionery flavor and the hard topping and the liquid topping;

c. the customer is prompted to pay for the selections using the payment system;

d. the slidable cup retaining platform and the customer access door opens;

e. the selected flavor frozen confectionery cup is delivered to the slidable cup retaining platform;

f. the customer removes the frozen confectionery cup lid and replaces the frozen confectionery cup on the slidable cup retaining platform; the customer access door closes;

g. the selected liquid topping and the selected hard topping are dispensed;

h. the customer access door opens;

i. the customer removes the frozen confectionery cup; and j. the customer access door closes, and the interactive frozen confectionery vending machine is returned to the initial waiting state.

* * * * *